(12) United States Patent
Wallat et al.

(10) Patent No.: US 9,373,044 B2
(45) Date of Patent: Jun. 21, 2016

(54) TRAILER LANE DEPARTURE WARNING SYSTEM

(71) Applicant: Ford Global Technologies, LLC, Dearborn, MI (US)

(72) Inventors: Jeffrey Wallat, Canton, MI (US); John Robert Van Wiemeersch, Novi, MI (US); Steven Yellin Schondorf, Dearborn, MI (US); Brian Bennie, Sterling Heights, MI (US); Timothy Prodin, Dearborn, MI (US); Brian Wolski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 14/195,271

(22) Filed: Mar. 3, 2014

(65) Prior Publication Data

US 2014/0176716 A1 Jun. 26, 2014

Related U.S. Application Data

(63) Continuation-in-part of application No. 13/190,010, filed on Jul. 25, 2011, now Pat. No. 8,665,078.

(51) Int. Cl.
*G08B 21/00* (2006.01)
*G06K 9/00* (2006.01)
(Continued)

(52) U.S. Cl.
CPC ........... *G06K 9/00798* (2013.01); *B60W 30/12* (2013.01); *B62D 15/025* (2013.01); *G08G 1/167* (2013.01); *B60W 2050/0075* (2013.01)

(58) Field of Classification Search
None
See application file for complete search history.

(56) References Cited

U.S. PATENT DOCUMENTS

| 4,042,132 A | * | 8/1977 | Bohman | ............... A01D 43/073 414/335 |
| 4,212,483 A | | 7/1980 | Howard | |

(Continued)

FOREIGN PATENT DOCUMENTS

| DE | 3931518 A1 | 4/1991 |
| DE | 9208595 U1 | 8/1992 |

(Continued)

OTHER PUBLICATIONS

Delphi Corporation. "Delphi Lane Departure Warning." 2 pages. Printed Dec. 17, 2013.

(Continued)

*Primary Examiner* — Curtis King
(74) *Attorney, Agent, or Firm* — Frank MacKenzie; Price Heneveld LLP

(57) ABSTRACT

A lane departure warning system has a trailer detector for detecting that a trailer is attached to a vehicle, a lane boundary detector for detecting a position of a lane boundary on a roadway over which the vehicle is travelling, and an information processor including a calibrator for generating calibration parameters used in determining an unintended lane departure event with respect to the lane boundary. The information processor initiates a process for allowing an operator to provide trailer width information when the trailer detector indicates that the vehicle is towing a trailer. The lane departure warning system also includes a sensor for detecting a hitch angle between the vehicle and the trailer. A controller determines a lateral offset of the trailer relative to the vehicle based on the hitch angle and a length of the trailer for generating a warning signal when the lateral offset crosses the lane boundary.

20 Claims, 10 Drawing Sheets

(51) Int. Cl.
  *B60W 30/12* (2006.01)
  *G08G 1/16* (2006.01)
  *B62D 15/02* (2006.01)
  *B60W 50/00* (2006.01)

(56) References Cited

U.S. PATENT DOCUMENTS

| | | |
|---|---|---|
| 5,056,905 A | 10/1991 | Jensen |
| 5,108,123 A | 4/1992 | Rubenzik |
| 5,132,851 A | 7/1992 | Bomar et al. |
| 5,152,544 A | 10/1992 | Dierker, Jr. et al. |
| 5,191,328 A | 3/1993 | Nelson |
| 5,290,057 A | 3/1994 | Pellerito |
| 5,455,557 A * | 10/1995 | Noll .................... B60D 1/36 280/477 |
| 5,521,633 A | 5/1996 | Nakajima et al. |
| 5,541,778 A | 7/1996 | DeFlorio |
| 5,559,696 A | 9/1996 | Borenstein |
| 5,631,656 A | 5/1997 | Hartman et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,124,709 A | 9/2000 | Allwine |
| 6,151,175 A | 11/2000 | Osha |
| 6,198,386 B1 | 3/2001 | White, II |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,472,865 B1 | 10/2002 | Tola et al. |
| 6,568,093 B2 | 5/2003 | Kogiso et al. |
| 6,577,952 B2 | 6/2003 | Geier et al. |
| 6,712,378 B1 | 3/2004 | Austin |
| 6,838,979 B2 | 1/2005 | Deng et al. |
| 6,857,494 B2 | 2/2005 | Kobayashi et al. |
| 6,879,240 B2 | 4/2005 | Kruse |
| 7,005,974 B2 | 2/2006 | McMahon et al. |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,167,785 B2 | 1/2007 | Lohberg et al. |
| 7,170,285 B2 | 1/2007 | Spratte |
| 7,171,330 B2 | 1/2007 | Kruse et al. |
| 7,269,489 B2 | 9/2007 | Deng et al. |
| 7,295,907 B2 | 11/2007 | Lu et al. |
| 7,367,407 B2 | 5/2008 | Lannert |
| 7,405,557 B2 | 7/2008 | Spratte et al. |
| 7,425,889 B2 | 9/2008 | Widmann et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,561,032 B2 | 7/2009 | Huang et al. |
| 7,566,851 B2 | 7/2009 | Stein et al. |
| 7,648,153 B2 | 1/2010 | Metternich et al. |
| 7,693,661 B2 | 4/2010 | Iwasaka |
| 7,731,302 B2 | 6/2010 | Tandy, Jr. et al. |
| 7,737,832 B2 | 6/2010 | Baratoff et al. |
| 7,878,545 B2 | 2/2011 | Rhymer et al. |
| 7,905,507 B2 | 3/2011 | Perri |
| 7,905,555 B2 | 3/2011 | Huntimer |
| 7,953,536 B2 | 5/2011 | Katrak |
| 7,974,444 B2 | 7/2011 | Hongo |
| 8,010,252 B2 | 8/2011 | Getman et al. |
| 8,157,284 B1 | 4/2012 | McGhie et al. |
| 8,167,444 B2 | 5/2012 | Lee et al. |
| 8,174,576 B2 | 5/2012 | Akatsuka et al. |
| 8,180,543 B2 | 5/2012 | Futamura et al. |
| 8,192,036 B2 | 6/2012 | Lee et al. |
| 8,215,436 B2 | 7/2012 | DeGrave et al. |
| 8,308,182 B2 | 11/2012 | Ortmann et al. |
| 8,350,684 B2 | 1/2013 | McClure |
| 8,428,821 B2 | 4/2013 | Nilsson |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,626,382 B2 | 1/2014 | Obradovich |
| 8,675,953 B1 | 3/2014 | Elwell et al. |
| 8,807,261 B2 | 8/2014 | Subrt et al. |
| 8,886,400 B2 | 11/2014 | Kossira et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,120,358 B2 | 9/2015 | Motts et al. |
| 9,120,359 B2 | 9/2015 | Chiu et al. |
| 2001/0024333 A1 | 9/2001 | Rost |
| 2002/0128764 A1 | 9/2002 | Hecker et al. |
| 2004/0017285 A1 | 1/2004 | Zielinski et al. |
| 2004/0093139 A1 | 5/2004 | Wildey et al. |
| 2005/0128059 A1 | 6/2005 | Vause |
| 2005/0206231 A1 | 9/2005 | Lu et al. |
| 2005/0236201 A1 | 10/2005 | Spannheimer et al. |
| 2005/0242931 A1 | 11/2005 | Gunderson et al. |
| 2006/0041358 A1 | 2/2006 | Hara |
| 2006/0142936 A1 * | 6/2006 | Dix .................... A01B 79/005 701/50 |
| 2006/0155455 A1 | 7/2006 | Lucas et al. |
| 2007/0179697 A1 | 8/2007 | Holler |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0186204 A1 | 8/2008 | Buckley |
| 2008/0231701 A1 * | 9/2008 | Greenwood .............. B60R 1/00 348/148 |
| 2009/0005932 A1 * | 1/2009 | Lee .......................... B60D 1/58 701/41 |
| 2009/0079828 A1 | 3/2009 | Lee et al. |
| 2009/0085775 A1 | 4/2009 | Otsuka et al. |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0039722 A1 * | 2/2010 | Lee .......................... B60R 1/00 359/843 |
| 2010/0191421 A1 | 7/2010 | Nilsson |
| 2011/0018231 A1 | 1/2011 | Collenberg |
| 2011/0022282 A1 | 1/2011 | Wu et al. |
| 2011/0140872 A1 * | 6/2011 | McClure .............. B60Q 9/008 340/431 |
| 2011/0160956 A1 | 6/2011 | Chung et al. |
| 2012/0004805 A1 | 1/2012 | Gray et al. |
| 2012/0041658 A1 | 2/2012 | Turner |
| 2012/0112434 A1 | 5/2012 | Albers et al. |
| 2012/0283909 A1 | 11/2012 | Dix |
| 2013/0027195 A1 | 1/2013 | Van Wiemeersch et al. |
| 2013/0250114 A1 | 9/2013 | Lu |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058668 A1 | 2/2014 | Trombley et al. |
| 2014/0088824 A1 | 3/2014 | Ishimoto |
| 2014/0160276 A1 | 6/2014 | Pliefke et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267868 A1 | 9/2014 | Mazzola et al. |
| 2014/0267869 A1 | 9/2014 | Sawa |
| 2014/0277941 A1 | 9/2014 | Chiu et al. |

(56) References Cited

U.S. PATENT DOCUMENTS

| | | |
|---|---|---|
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0002670 A1* | 1/2015 | Bajpai ............... G06K 9/00791 348/148 |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |

FOREIGN PATENT DOCUMENTS

| | | |
|---|---|---|
| DE | 10154612 A1 | 5/2003 |
| DE | 102004050149 A1 | 4/2006 |
| DE | 102006013817 | 9/2007 |
| DE | 102006013817 A1 | 9/2007 |
| DE | 102011120814 A1 | 6/2013 |
| EP | 0418653 A1 | 3/1991 |
| EP | 1361543 A2 | 11/2003 |
| EP | 2452549 A1 | 5/2012 |
| EP | 2551132 A1 | 1/2013 |
| EP | 2644477 A1 | 10/2013 |
| EP | 2803944 A2 | 11/2014 |
| JP | 2003148938 A | 5/2003 |
| JP | 3716722 B2 | 11/2005 |
| JP | 2008027138 A1 | 2/2008 |
| JP | 2012166647 A | 9/2012 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |

OTHER PUBLICATIONS

Delphi Corporation "Delphi Lane Departure Warning"; Dec. 17, 2013; 2 pages.

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

* cited by examiner

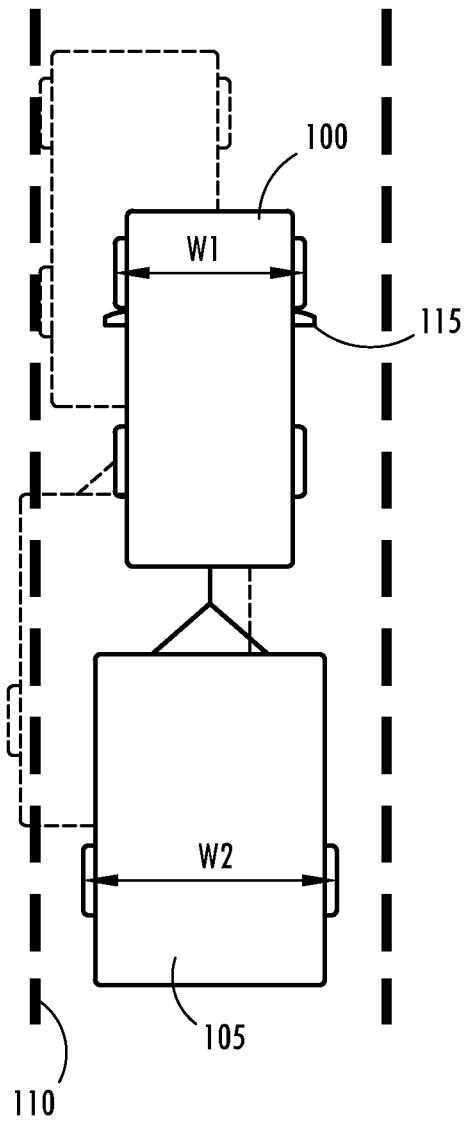 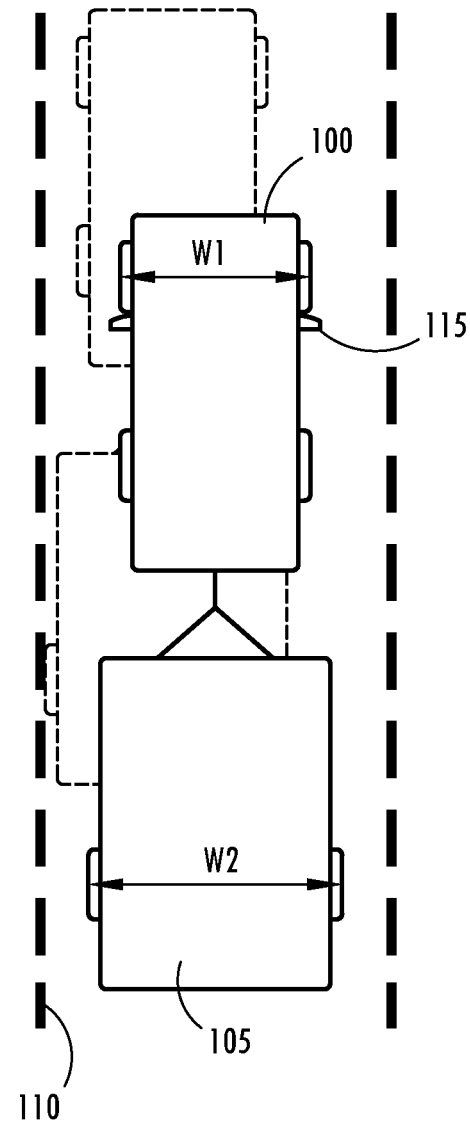
FIG. 1A  FIG. 1B

TRAILER LANE DEPARTURE WARNING SYSTEM

CROSS-REFERENCE TO RELATED APPLICATION

This application is a continuation-in-part of U.S. patent application Ser. No. 13/190,010, filed on Jul. 25, 2011, entitled "Width Calibration Of Lane Departure Warning System." The aforementioned related application is hereby incorporated by reference.

FIELD OF THE INVENTION

The disclosures made herein relate generally to driver assist features and, more particularly, to implementation of lane departure warning functionality for a vehicle used for towing a trailer.

BACKGROUND OF THE INVENTION

A lane departure warning (LDW) system provides the functionality of alerting a driver of a vehicle when the vehicle departs a lane in which it is travelling without use of lane change indicators. In this regard, a LDW system interprets a lane departure without the use of a turn signal (e.g., when the vehicle is travelling at or above a particular speed) to be an unintentional lane departure. Typically, LDW systems may be calibrated for detecting instances of unintentional lane departure based on a known width (e.g., track width and/or overall width) of a vehicle in which a particular LDW system is implemented. Presently, if a warning by a LDW system of a vehicle is needed based on a different track width and/or overall width, existing LDW systems do not offer a solution for appropriately updating/modifying a pre-set track width and/or overall width calibration for the vehicle. For example, when a vehicle equipped with a LDW system is pulling a trailer, the trailer is often wider than the vehicle or the vehicle may have temporary side view mirrors that extend farther away from the vehicle than standard equipment mirrors. Furthermore, the present LDW systems generally do not accommodate for a hitch angle of the attached trailer that may be indicative of trailer sway or other trailer conditions that unintentionally position the trailer outside of the lane in which the vehicle is traveling. Thus, there is a need for a solution to allow a vehicle operator to calibrate a LDW system of a vehicle for a set of parameters at least partially based on a width of a trailer and to operate a LDW system that accounts for the position of an attached the trailer.

These and other aspects, objects, and features of the present invention will be understood and appreciated by those skilled in the art upon studying the following specification, claims, and appended drawings.

BRIEF SUMMARY OF THE INVENTION

According to one embodiment of the present invention, a lane departure warning system for a vehicle towing a trailer includes an imager detecting a lane boundary on a roadway and a sensor detecting a hitch angle between the vehicle and the trailer. A controller determines a lateral offset of the trailer relative to the vehicle based on the hitch angle and a length of the trailer. A warning apparatus generates a signal when the lateral offset crosses the lane boundary.

According to another embodiment of the present invention, a method for providing a lane departure warning for a vehicle towing a trailer includes detecting a lane boundary on a roadway with an imager. The method also provides sensing a hitch angle between the vehicle and the trailer. In addition, the method provides determining a lateral offset of the trailer relative to the vehicle based on the hitch angle and length and width dimension of the trailer. The method further provides generating a warning signal when the lateral offset traverses the lane boundary.

According to yet another embodiment of the present invention, a method for providing a lane departure warning for a vehicle towing a trailer includes detecting a lane boundary on a roadway proximate the vehicle and determining a curvature of the roadway proximate the vehicle. The method also provides sensing a hitch angle between the vehicle and the trailer and determining a lateral offset of an outside rear portion the trailer relative to the vehicle based on the hitch angle, a length of the trailer, and a width of the trailer. The method further provides reducing the lateral offset when the curvature is greater than a threshold curvature tightness and correlates with an orientation of the hitch angle, such that the method also provides generating a warning signal when the lateral offset crosses the lane boundary.

These and other objects, embodiments, advantages and/or distinctions of the present invention will become readily apparent upon further review of the following specification, associated drawings and appended claims.

BRIEF DESCRIPTION OF THE DRAWINGS

FIG. 1A is an illustrative top plan view of a vehicle and a trailer showing a scenario in which a width of the trailer attached to the vehicle has resulted in the trailer breaching a lane boundary even though the vehicle towing the trailer has not breached the lane boundary;

FIG. 1B is an illustrative top plan view of the vehicle and trailer of FIG. 1 where a lane departure warning system of the vehicle is configured for monitoring for unintended lane departures based on a width defined by the trailer, as opposed to a width defined by the vehicle;

DETAILED DESCRIPTION OF THE EMBODIMENTS

For purposes of description herein, the terms "upper," "lower," "right," "left," "rear," "front," "vertical," "horizontal," and derivatives thereof shall relate to the invention as oriented in FIGS. 4-9. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1A and 1B, a vehicle 100 has a trailer 105 attached thereto. The vehicle 100 has a respective width W1 and the trailer 105 has a respective width W2. In the context of a lane departure warning (LDW) system configured in accordance with the present disclosure, a width of a vehicle or trailer can be defined by a number of different portions of the vehicle or trailer. In one example, a track width (referenced by tires of the vehicle or trailer) can define the width of the vehicle or trailer with respect to LDW functionality. In another example, an overall width of a body of the vehicle or trailer can define the width of the vehicle or trailer with respect to LDW functionality. In still another example, a width at a maximum width portion of a vehicle or trailer (e.g., as defined between side view mirrors of a vehicle) can define the width of the vehicle or trailer with respect to LDW functionality. As such, in the context of a lane departure warning (LDW) system configured in accordance with the present disclosure, a width of a vehicle or a trailer is not unnecessarily limited by a particular width dimension or location at which a width is specified.

Referring to FIG. 1A, when the trailer 105 has a wider width than does the vehicle 100, it can be seen that the trailer 105 exhibits encroachment or breaching with respect to a lane boundary 110 (e.g., a painted lane stripe) prior to the vehicle doing so. Accordingly, when the LDW system of the vehicle 100 has a baseline calibration that is a function of the vehicle width W1, the LDW system will not provide indication of an instance of unintended lane departure even though the trailer has experienced such an unintended lane departure. Baseline calibration refers to a calibration based on a preset width value (e.g., a prescribed/known width of the vehicle). Advantageously, as shown in FIG. 1B, a LDW system configured in accordance with an embodiment of the present disclosure allows for calibration of the LDW system to be defined such that warnings of actual or possible unintended lane departures are a function of the trailer width W2 as opposed to the vehicle width W1.

Figure 1C:
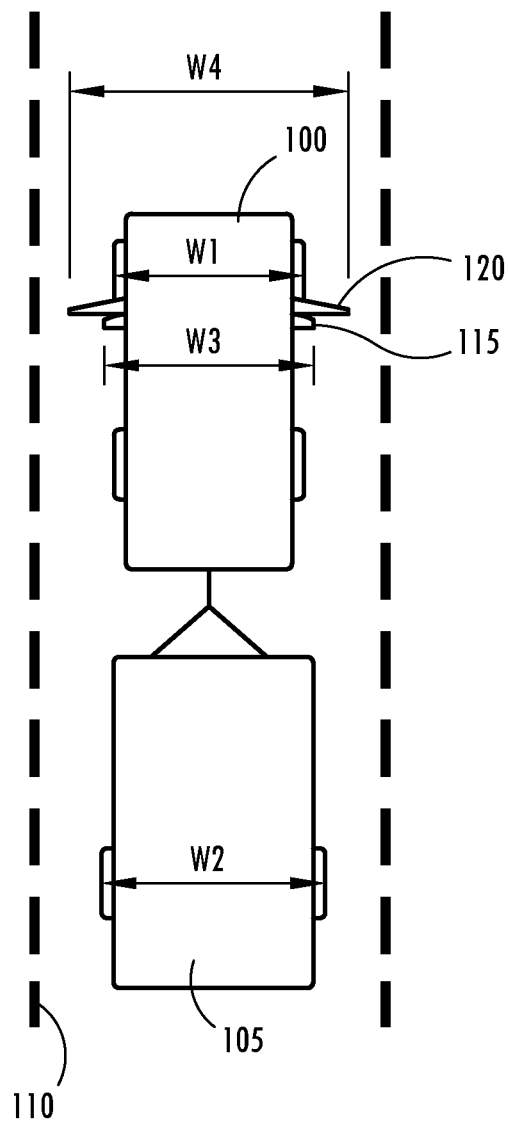
FIG. 1C is an illustrative top plan view of the vehicle and trailer of FIG. 1A where a lane departure warning system of the vehicle is configured for monitoring for unintended lane departures based on a width defined by side view mirror added to the vehicle as opposed to a width defined by the vehicle or by the trailer.

Referring to FIG. 1C, the vehicle 100 is equipped with standard width side view mirrors 115 that are at a position that does not provide optimal or acceptable viewing performance when the trailer 105 is being pulled by the vehicle 100. To provide for such optimal or acceptable viewing performance when the trailer 105 is being pulled by the vehicle 100, the vehicle 100 can be provided with extended width side view mirrors 120, which are one example of add-on vehicle equipment that define a width basis for a LDW system. As can be seen in FIG. 1C, the standard width side view mirrors 115 define a vehicle width W3 and the extended width side view mirrors 120 define a vehicle width W4 that is greater than the vehicle width W3. It is disclosed herein that the extended width side view mirrors 120 can be implemented as add-on mirrors that are temporarily installed on the vehicle 100 or can be permanently installed. As such, the extended width side view mirrors 120 can define the width basis upon which the LDW system of the vehicle should be calibrated. Advantageously, embodiments of the present disclosure can be configured to allow for calibration of the LDW system to be defined such that warnings of actual or possible unintended lane departures are a function of the width W4 of extended width side view mirrors 120.

Figure 2A:
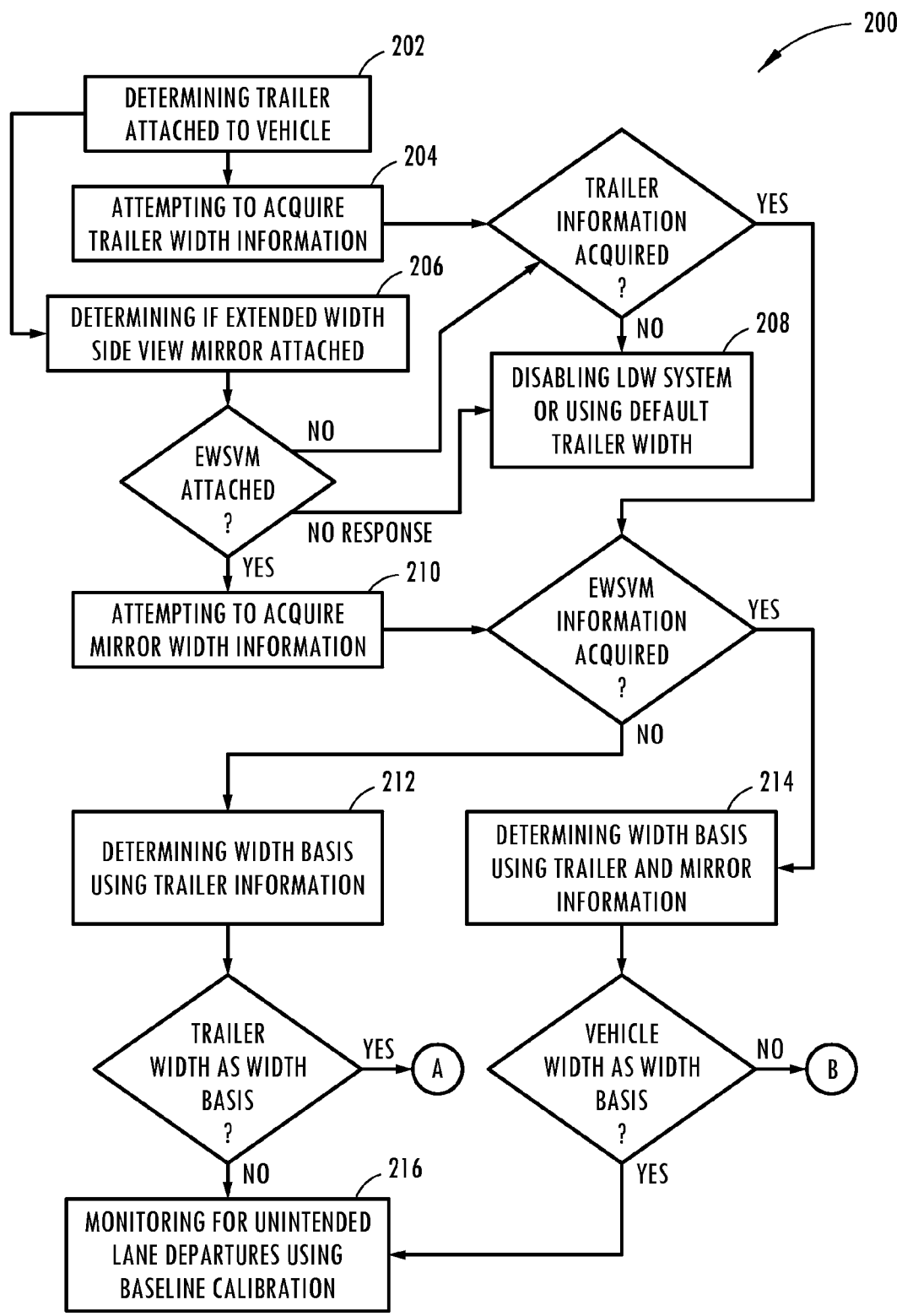
FIGS. 2A and 2B jointly show a flow diagram of a method for providing lane departure warning functionality in accordance with an embodiment of the present disclosure.
Figure 2B:
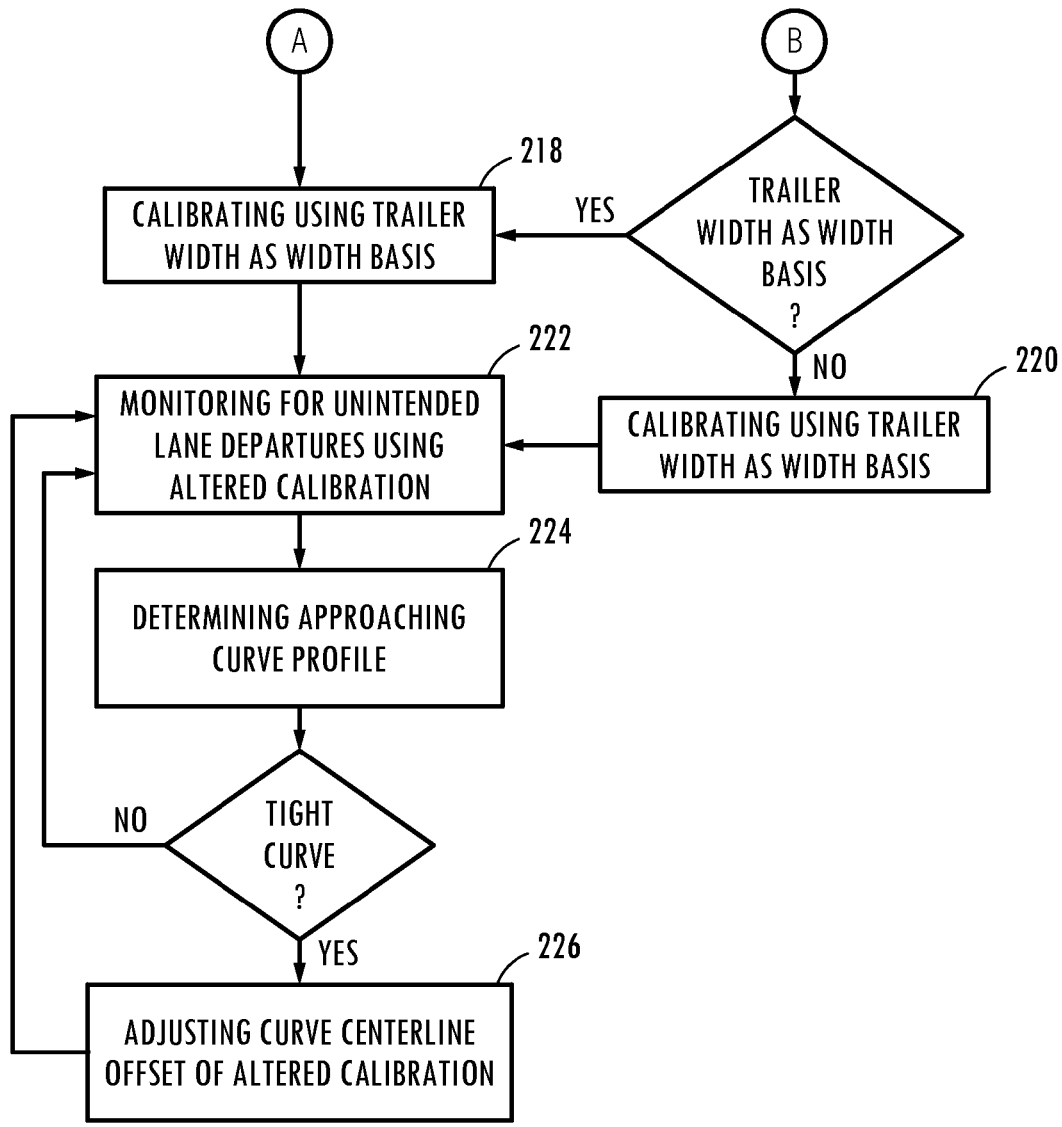

FIGS. 2A and 2B show a method 200 for providing lane departure warning functionality in accordance with an embodiment of the present disclosure. More specifically, the method 200 allows for calibration of a LDW system to be a function of the vehicle width W1, trailer width W2, or mirror width W4 such that warnings of actual or possible unintended lane departures can be a function of the vehicle width W1, the trailer width W2, or the mirror width W4. Furthermore, the method 200 also allows for calibration of the LDW system to be further altered in the case where the vehicle/trailer combination is or will travel through one or more curves having less than a particular radius. In the context of the disclosures made herein, a corner is defined to include a curve. In these regards, the method 200 enhances functionality of a LDW system of a vehicle that would otherwise be limited to providing warnings based only as a function of a width of the vehicle in which the LDW system is installed. In one embodiment, the method 200 is repeated for each cycling of the vehicle ignition key between on and off positions and LDW functionality is active only above a prescribed vehicle speed (e.g., above 40 mph).

An operation 202 is performed for determining that a trailer is attached to a vehicle equipped with a LDW system having a baseline calibration that is a function of the width of the vehicle. Examples of approaches for determining that the trailer is attached to the vehicle include, but are not limited to, detecting that the trailer is connected to trailer-specific electronics of the vehicle (e.g., a trailer circuit of a power distribution junction box, a trailer brake controller, and/or a trailer sway controller), using an image provided by a rear view or 180 degree side-view camera, using signal of parking aids that indicate a detected obstacle is at a constant distance while the vehicle is in motion, and/or sensing a change in overall vehicle mass that could be consistent with attachment of a trailer. However, it is disclosed herein that embodiments of the present disclosure are not unnecessarily limited to any particular means for detecting a trailer attached to a vehicle or determining that a trailer is attached to the vehicle.

In response to determining that a trailer is attached to the vehicle, an operation 204 is performed for attempting to acquire trailer width information and an operation 206 is performed for determining if an extended width side view mirror is attached to the vehicle. A preferred embodiment of determining if an extended width side view mirror is installed on the vehicle includes querying the vehicle operator if extended width side view mirrors have been installed on the vehicle. Such query can be made in response to determining that a trailer has been attached to the vehicle (e.g., using a trailer attachment determination technique discussed above). However, it is disclosed herein that embodiments of the present disclosure are not unnecessarily limited to any particular means or method for determining if one or more extended width side view mirrors are attached to a vehicle. In one embodiment, attempting to acquire the trailer width information includes querying an operator of the vehicle for a width of the trailer (i.e., inputting a trailer width value). It is disclosed herein that the trailer width value query may consist of operator input of trailer width value or selection from several preset trailer width options pre-programmed in the vehicle. In another embodiment, attempting to acquire the trailer width information includes outputting a trailer positioning instruction to an operator of the vehicle instructing the vehicle operator to maneuver the vehicle to position the trailer within a specified proximity to one or more lane boundaries on a roadway over which the vehicle is travelling (e.g., adjacent to a lane dividing boundary and/or a shoulder boundary). In another embodiment of the present disclosure, attempting to acquire the trailer width information includes accessing a maximum legal trailer width based upon specifications of the vehicle and/or municipality regulations where the vehicle is located. In still another embodiment of the present disclosure, attempting to acquire the trailer width information includes accessing a signal provided by one or more imaging devices (e.g., rearward looking and/or side looking cameras) of the vehicle. Additionally, a Telematics feature may be used to access off-board data on trailer width based on a model number or manufacturer entered by the driver. However, it is disclosed herein that embodiments of the present disclosure are not unnecessarily limited to any particular means for attempting to acquire trailer width information.

In response to the trailer width information not being successfully acquired (e.g., not being received after being requested) or there is no response to a query requesting confirmation that an extended width side view mirror is attached, an operation 208 is performed for disabling the LDW system or using a default trailer width for calibrating the LDW system. If it is confirmed that an extended width side view mirror is not attached, the method continues at the output of the block 204 for attempting to acquire trailer width information. In one embodiment, using a default trailer width can include providing a notice to the vehicle operator that the LDW system has defaulted to the largest legal trailer width allowed for a GPS location of the vehicle. If the vehicle location or the largest legal allowable trailer cannot be established then the LDW system can be disabled and, optionally, explain the rationale for such disabling. Alternatively, such use of the default trailer width can be omitted and the LDW system is disabled in response to the trailer width information not being successfully acquired.

In response to a determination being made that an extended width side view mirror is attached to the vehicle, an operation 210 is performed for attempting to acquire mirror width information. Such mirror width information refers to a reference distance as defined by an outermost edge of at least one extended width side view mirrors attached to the vehicle. In one embodiment, attempting to acquire mirror width information can include querying for a measured dimension from a known surface of the vehicle's door to the outermost edge portion the extended with side view mirror. In another embodiment, attempting to acquire mirror width information can include querying for a model number of the extended width side view mirror. In another embodiment, attempting to acquire mirror width information can include querying for a prescribed mirror indicating value provided by a trailer rental entity. In another embodiment, attempting to acquire mirror width information can include instructing a vehicle operator to park the vehicle inside a particular parking space that has an empty parking space in front of it that shares a common straight line with the particular parking space. In response to verify that the extended width side view mirror is inside the parking space lane (or mirrors inside the particular parking space in the case of left and right side mirrors being attached), the LDW system would acquire estimated mirror width information from the lines of the empty parking space using a forward looking camera. In another embodiment, attempting to acquire mirror width information can include querying for whether or not the extended width side view mirror extends outward farther than a deployable running board in its deployed position. In another embodiment, attempting to acquire mirror width information can include instructing the vehicle operator to pull the vehicle adjacent to a wall such that the extended width side view mirror is nearly touching the wall thereby allowing the extended width side view mirror information to acquired using a blind spot information system and/or outboard ultrasonic sensors. In another embodiment, attempting to acquire mirror width information can include attempting to detect an outermost point of the extended width side view mirror through use of side cameras that may be part of a 360-view system or added specifically for this purpose. In yet another embodiment, attempting to acquire mirror width information can include instructing the vehicle operator to pull the vehicle up to a reflective surface (e.g., a glass store front) and attempting to detect outermost point of the extended with side view mirror by using a front camera viewing a reflected image of the vehicle.

In response to the extended width side view mirror information not being successfully acquired and the trailer width information being successfully acquired, an operation 212 is performed using the trailer width information for determining a width basis upon which the LDW system is to be calibrated. In response to the extended width side view mirror information being successfully acquired and the trailer width information being successfully acquired, an operation 214 is performed using the trailer width information and extended width side view mirror information for determining a width basis upon which the LDW system is to be calibrated. The width basis refers to whether a width defined by e vehicle, a width defined by the extended width side view mirror, or a width defined by the trailer will be used by the LDW system in its calibration. The width basis will be that defined by the trailer if it is determined from the trailer width information, extended width side view mirror information, and, if needed, known vehicle width information that the width defined by the trailer is calculated or approximated to be greater than the width defined by the vehicle and the width defined by the extended width side view mirror(s). The width basis will be that defined by the extended width side view mirror(s) if it is determined from the trailer width information, extended width side view mirror information, and, if needed, known vehicle width information that the width defined by the extended width side view mirror(s) is calculated or approximated to be greater than the width defined by the vehicle and the width defined by the trailer. Otherwise, the width basis will be that defined by the width of the vehicle. In one example, a provided trailer width value can be compared against a known vehicle width value to determine the width basis. In another example, a position of the trailer and vehicle relative to a lane boundary (e.g., as identified by one or more cameras of the vehicle) can be used for estimating a difference between the trailer width and the vehicle width. In the context of a LDW system, calibrated refers to specification of parameters and/or generation of parameters that indicated when an instance of an unintended lane departure is taking place or is anticipated to take place without appropriate corrective action (e.g., corrective steering input). Examples of acquiring the trailer width information include, but are not limited to, receiving a query reply that specifies the width of the trailer, receiving acknowledgement that the vehicle operator has maneuvered the vehicle to position the trailer within the specified proximity to the lane boundary, and receiving a signal and/or data from one or more imaging devices of the vehicle.

If a width defined by the vehicle is determined to be the width basis for calibration, an operation 216 is performed for monitoring for unintended lane departures using the baseline calibration (e.g., a known or pre-defined width of the vehicle). In effect, the method terminates after initiating a default LDW functionality. It is disclosed herein that an operation for determining calibration parameters using the vehicle width can be performed prior to or as a part of the operation for monitoring for unintended lane departures using the baseline calibration.

If a width defined by the trailer is determined to be the width basis for calibration, an operation 218 is performed for calibrating the LDW system using the trailer width information (i.e., a trailer width based calibration). In one embodiment, such calibrating includes calculating, determining, and/or accessing calibration parameters upon which such monitoring will be performed. Accordingly, in this manner, functionality of the LDW system is based on the baseline calibration that is a function of the trailer width as opposed to a function of the vehicle width. Otherwise, if a width defined by the extended width side view mirror(s) is determined to be the width basis for calibration, an operation 220 is performed for calibrating the LDW system using the mirror width information (i.e., a mirror width based calibration). Following such calibrating, an operation 222 is performed for monitoring for unintended lane departures using appropriate width based calibration (e.g., a calibration corresponding to the trailer width information or a calibration corresponding to the mirror width information.

While monitoring for instances of unintended lane departure, an operation 224 is performed for determining if the vehicle is approaching (or within) a curve defined by the LDW system (or other vehicle system) as being a low-radius curve. Such a low-radius curve can be defined as such by any number of parameters including, but not limited to, ratio of a radius of the curve to a width of the trailer, a minimum radius of the curve, a maximum radius of the curve, ratio of min curve radius-to-max curve radius, profile of roadway immediately proceeding or following the curve, posted speed of the curve, posted speed of the roadway immediately proceeding the curve, etc. If it is determined that the vehicle is not approaching (or within) a tight curve, continue monitoring for unintended lane departures using the trailer width based calibration. Otherwise, if it is determined that the vehicle is approaching (or within) a tight curve, an operation 226 is performed for adjusting (e.g., increasing) a curve centerline offset parameter of the trailer width based calibration and continuing to monitor for unintended lane departures using the trailer width based calibration having an increased curve centerline offset parameter. In one embodiment, the curve centerline offset parameter is adjusted to compensate a warning zone of the LDW system to be further toward a center of the lane in which the vehicle is travelling than it would be on a straight road. In another embodiment, approaching the tight curve, the curve centerline offset parameter is adjusted to compensate the warning zone further toward the center of the lane to promote an inside to outside path of travel. In still another embodiment, the curve centerline offset parameter is adjusted to disable or counteract a normal curve cutting algorithm that reduces warnings so that the vehicle operator will be aware sooner that the trailer may be approaching a lane boundary. In another embodiment, the curve centerline offset parameter is adjusted dynamically based on trailer length and trailer hitch angle to vehicle. Trailer hitch angle can be detected through a rearward looking camera, and the trailer length can be input by the same method as trailer width.

Figure 3:
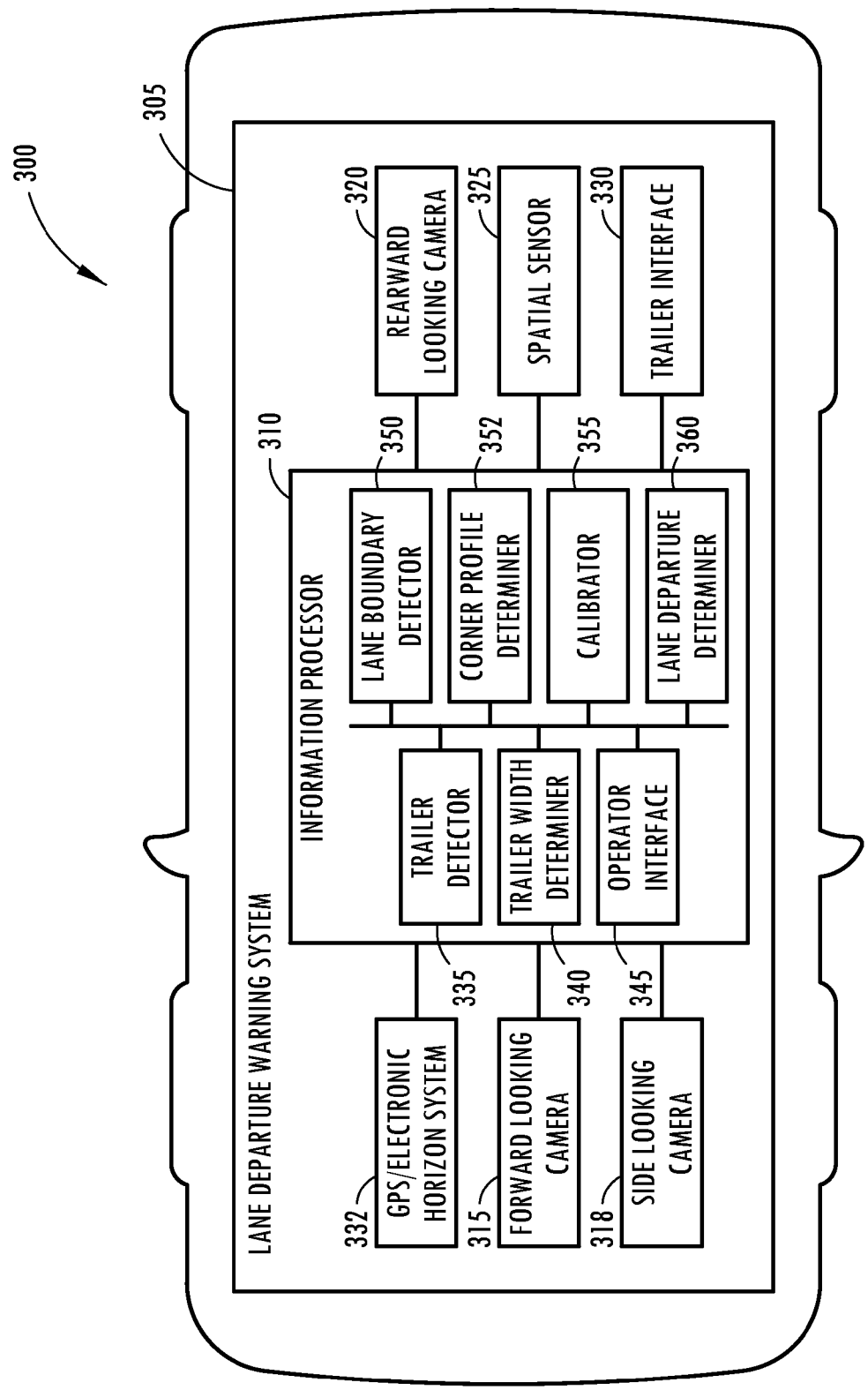
FIG. 3 is a schematic block diagram of a vehicle having a lane departure warning system configured in accordance with an embodiment of the present disclosure.

FIG. 3 shows a vehicle 300 having a LDW system 305 configured in accordance with an embodiment of the present disclosure. The LDW system 305 allows for LDW functionality to be a based on a width of the vehicle 300 or a width of a trailer attached to the vehicle 300 such that warnings of actual or possible unintended lane departures are a function of the vehicle width or the trailer width. In this regards, in a preferred embodiment, the LDW system 305 is configured for providing LDW functionality as disclosed above in reference to the method 200.

The LDW system 305 includes an information processor 310, a forward looking camera 315, a side looking camera 318, a rearward looking camera 320, a spatial sensor 325, a trailer interface 330 and GPS/electronic horizon system 332. The information processor 310 is coupled to the forward looking camera 315, the rearward looking camera 320, the spatial sensor 325, the trailer interface 330 and GPS/electronic horizon system 332 for allowing information (e.g., data, signals, etc) to be communicated therebetween. It is disclosed herein that the forward looking camera 315, the rearward looking camera 320, the spatial sensor 325, and the trailer interface 330 may or may not be dedicated elements of the LDW system 305 in that one or more of these system components may be utilized by another system of the vehicle 300.

The information processor 310 acquires information from the forward looking camera 315, the rearward looking camera 320, the spatial sensor 325, and/or the trailer interface 330 and/or the GPS/electronic horizon system 332 for implementing LDW functionality. The information processor 310 can acquire information from the forward looking camera 315 and the side looking camera 318 for determining lane boundaries, thus making such cameras part of a lane boundary detecting apparatus. The information processor 310 can acquire trailer width information from the side looking camera 318 and/or the rearward looking camera 320, thus making such cameras part of a trailer detecting apparatus. The information processor 310 can also acquire trailer width information from the spatial sensor 325, thus making the spatial sensor part of a trailer detecting apparatus. Ultrasonic sensors, Infrared sensors, or radar sensors are examples of the spatial sensor 325. The trailer interface, which is an electrical interface between the vehicle 305 and an attached trailer, can provide information to the information processor for detecting presence of the attached trailer (i.e., that it is attached to the vehicle 300). It is disclosed herein that a trailer detector can detect that the trailer is attached to the vehicle 300 and a lane boundary detector can detect a position of a lane boundary on a roadway over which the vehicle 300 is travelling.

The information processor includes a trailer detector 335, a trailer width determiner 340, an operator interface 345, a lane boundary detector 350, a curve profiler 352, a calibrator 355, and a lane departure determiner 360. In a preferred embodiment, the trailer detector 335, the trailer width determiner 340, the operator interface 345, the lane boundary detector 350, the curve profiler 352, the calibrator 355, and the lane departure determiner 360 are coupled together for allowing communication of data/information therebetween. The trailer detector 335 detects attachment of a trailer to the vehicle 300, such as through use of information provided by the rearward looking camera 320, the spatial sensor 325, and/or the trailer interface 330. The trailer width determiner 340 determines a quantitative width of the trailer (e.g., trailer width value) and/or qualitative width of the trailer (e.g., wider than the vehicle but not wider than a maximum legal trailer width). The operator interface 345 outputs information queries to an operator of the vehicle and/or receives information query replies from the vehicle operator. For example, in a preferred embodiment, the operator interface 345 can output a trailer positioning instruction for reception by the vehicle operator and/or output a trailer width value query for reception by the vehicle operator. The lane boundary detector 350 detects one or more lane boundaries of a roadway over which the vehicle 300 is travelling, such as through use of information provided by the forward looking camera 315. The curve profiler 352 determines information relating to a relative tightness of a curve that the vehicle is approaching or is within, such as through use of information provided by the forward looking camera 315 and/or a global positioning system of the vehicle 300. The calibrator 355 provides calibration parameters upon which LDW monitoring will be performed. Such calibration parameters can be based on information acquired from the trailer detector 335, the trailer width determiner 340, the operator interface 345, the lane boundary detector 350 and/or the curve profiler 352. The lane departure determiner 360 uses the calibration parameters and information from the lane boundary detector 350 to monitor for instances of unintended lane departures.

Referring now to instructions processable by a data processing device, it will be understood from the disclosures made herein that methods, processes and/or operations adapted for carrying out lane departure warning functionality as disclosed herein are tangibly embodied by non-transitory computer readable medium having instructions thereon that are configured for carrying out such functionality. In one specific embodiment, the instructions are tangibly embodied for carrying out the method 200 disclosed above in reference to FIGS. 2A and 2B. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. In one embodiment of the present disclosure, the information processor 310 includes such data processing device and memory with such instructions being configured for carrying out the functionalities of the trailer detector 335, the trailer width determiner 340, the operator interface 345, the lane boundary detector 350, the calibrator 355, the lane departure determiner 360, and the curve profiler 365. Accordingly, embodiments of non-transitory computer readable medium in accordance with the present disclosure include a compact disk, a hard drive, RAM or other type of storage apparatus that has imaged thereon a computer program (i.e., instructions) adapted for carrying out lane departure warning functionality in accordance with the present disclosure.

With reference to FIGS. 4-9, the reference number 10 generally designates an additional embodiment of a lane departure warning system that is intended for a vehicle 100 towing a trailer 105. The lane departure warning system 10 includes an imager 16 that detects a lane boundary 18 on a roadway 20 and a sensor 22 that detects a hitch angle $\gamma$ between the vehicle 100 and the trailer 105. A controller 24 of the lane departure warning system 10 determines a lateral offset 26 of the trailer 105 relative to the vehicle 100 based on the hitch angle $\gamma$ and a length L of the trailer 105, such that a warning apparatus 28 generates a signal when the lateral offset 26 crosses the lane boundary 18.

Figure 4:
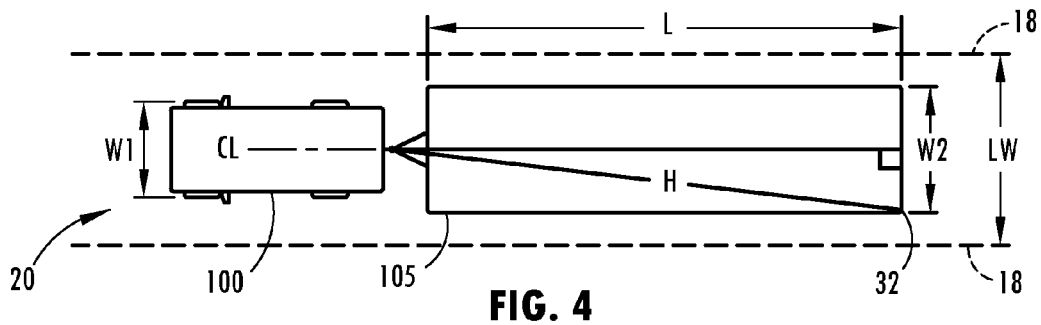
FIG. 4 is an illustrative top plan view of a vehicle towing a trailer in an in-line configuration along a straight section of a roadway, according to another embodiment of the present disclosure.

As illustrated in FIG. 4, the vehicle 100 is attached to the trailer 105 at a rotational point 30, such as a center of a hitch ball on the vehicle 100 attached to a coupling on a tongue of the trailer 105, for towing the trailer 105 along a lane of the roadway 20 that has a width LW defined between two lane boundaries 18. In this illustrated embodiment, the vehicle 100 has a width W1 that is less than the width W2 of the trailer 105. Accordingly, the lane departure warning system, as previously described, may calibrate to account for the larger width W2 of the trailer 105. Furthermore, the hitch angle $\gamma$ and the length L of the trailer 105 may be used in conjunction with the width W2 of the trailer 105 to determine a lateral offset 26 of the trailer 105 relative to the vehicle 100. The lateral offset 26 in the illustrated embodiment includes a distance perpendicular from a centerline CL of the vehicle 100 to a rear corner 32 of the trailer 105. As such, the lateral offset 26 in the embodiment shown in FIG. 4 is negligible as it is substantially equal to half of the width W2 of the trailer 105 due to the vehicle 100 and the trailer 105 being in a generally in-line configuration, or alternatively referred to as a hitch angle $\gamma$ of zero. However, it is understood that the lateral offset 26 may also include a distance perpendicular from a different fixed portion of the vehicle 100, such as an outside edge, to a rear area of the trailer 105 or an outside edge of a load being carried by the trailer 105.

Figure 5:
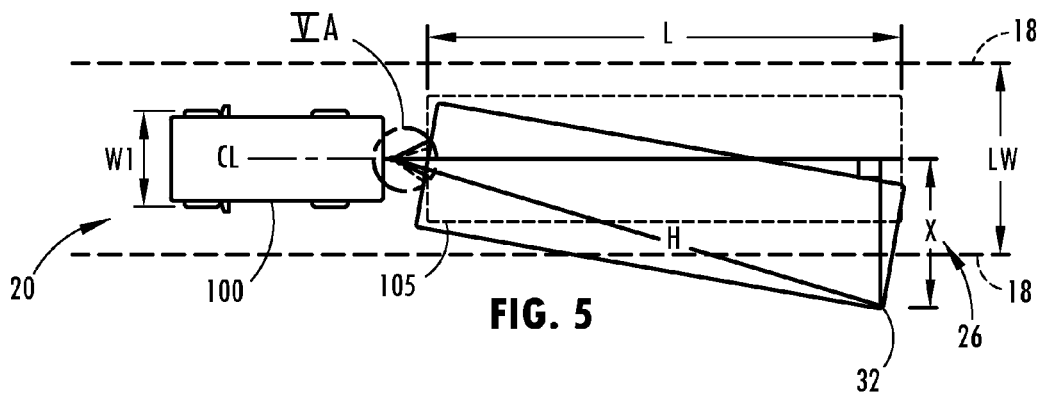
FIG. 5 is an illustrative top plan view of a vehicle towing a trailer with a non-zero hitch angle causing the trailer to traverse a lane boundary.
Figure 5A:
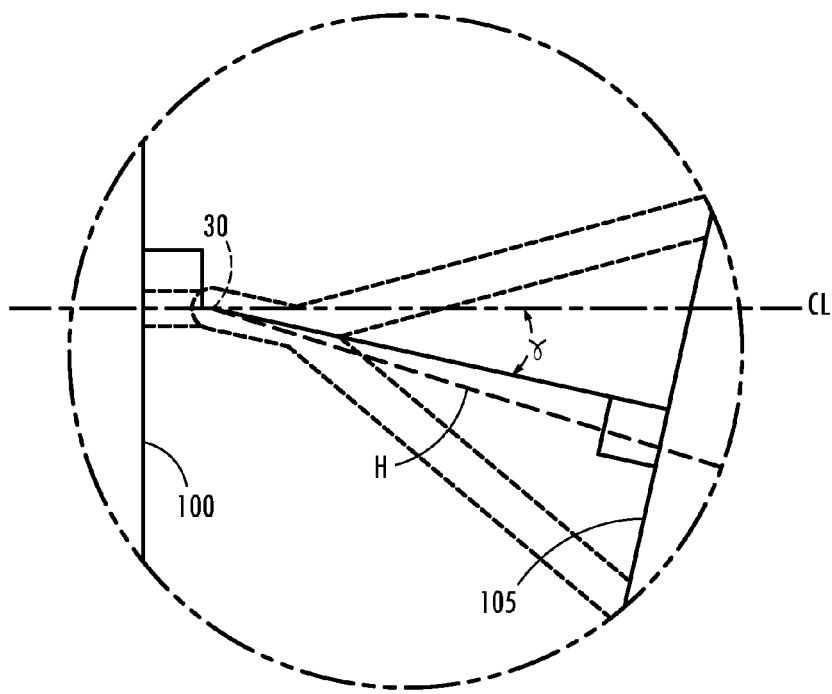
FIG. 5A is an enlarged sectional view of the hitch angle between the vehicle and the trailer, taken at section VA of FIG. 5.

With reference to FIGS. 5-5A, the width W1 of the vehicle 100 remains within the lane width LW, although the trailer condition changes from the in-line configuration shown in FIG. 4 to a bent condition defined by a non-zero hitch angle $\gamma$ and illustrated in this embodiment with the rear corner 32 of the trailer 105 departing from the lane. This bent condition on a straight section of roadway may be a result of trailer sway, braking in slippery conditions, or other conceivable driving conditions. As such, the hitch angle $\gamma$ between the vehicle 100 and the trailer 105 can be used in conjunction with the additional dimension of the trailer 105, specifically the width W2 of the trailer 105 and the length L of the trailer 105, to determine a lateral offset 26 of the vehicle 100 relative to the trailer 105. In the illustrated embodiment, the lateral offset 26 includes a distance perpendicular from a centerline CL of the vehicle 100 to a rear corner 32 of the trailer 105, which can be calculated as follows:

$$X = \sin(\gamma) * H$$

where,

X=distance perpendicular from a centerline CL of the vehicle 100 to a rear corner 32 of the trailer 105;

$\gamma$=hitch angle; and

H=distance from the rotational point 30 to a rear corner 32 of the trailer 105, which can be calculated as follows:

$$\sqrt{(L^2 + (\tfrac{1}{2} * W2)^2)}$$

where,

L=trailer length; and

W2=trailer width.

Solving for the above equations provides the distance perpendicular from the centerline CL of the vehicle 100 to the rear corner 32 of the trailer 105 for use with the lane departure warning system 10 of the present invention. It is also understood that the distance X solved from above may be alternatively determined, such as by sensing movement of the trailer 105 away from the centreline CL with an ultrasonic sensor 22 or a camera mounted on a side view mirror or other portion of the vehicle 100.

Figure 6:
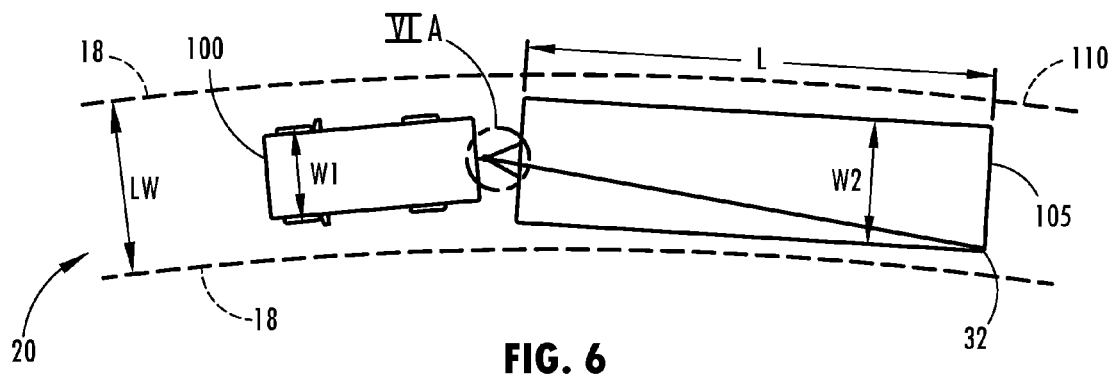
FIG. 6 is an illustrative top plan view of a vehicle towing a trailer in a bent configuration with a non-zero hitch angle along a curved section of a roadway.
Figure 6A:
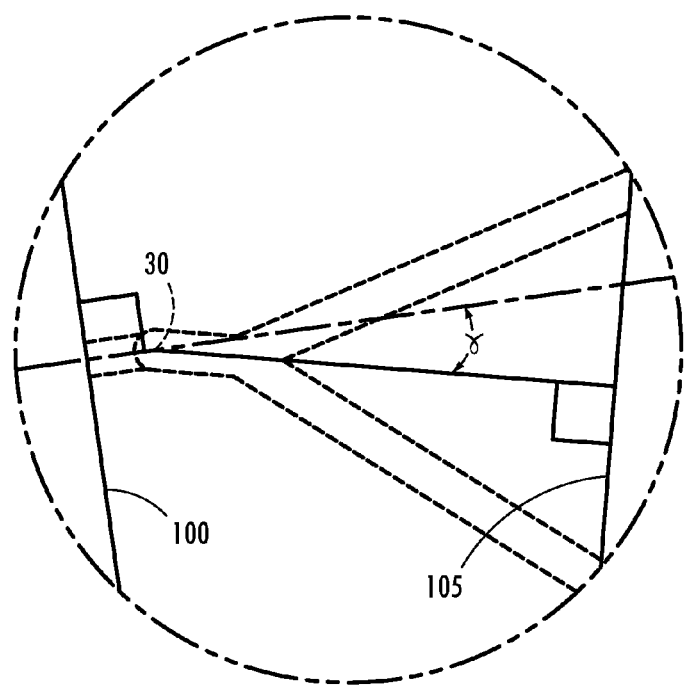
FIG. 6A is an enlarged sectional view of the hitch angle between the vehicle and the trailer, taken at section VIA of FIG. 6.

Referring now to FIGS. 6-6A, the vehicle 100 and the trailer 105 are shown in a bent configuration with a hitch angle $\gamma$ substantially equal to the hitch angle $\gamma$ illustrated in FIGS. 5-5A, although the vehicle 100 and the trailer 105 are traveling along a curved section of the roadway 20, where the hitch angle γ corresponds with a curvature of the roadway 20. Therefore, with respect to the embodiment shown in FIGS. 6-6A, the rear corner 32 of the trailer 105 does not depart from the lane, and accordingly, the lateral offset 26 may be configured to accommodate for the curvature to similarly not traverse the lane boundary 18. The lane departure warning system, according to one embodiment, may determine the curvature of the roadway 20 proximate the vehicle 100 based on information provided by a field of vision in front of the vehicle 100 monitored by the imager 16. In an additional embodiment, the lane departure warning system 10 may determine the curvature of the roadway 20 by monitoring a steering angle of the vehicle 100 with a steering angle sensor 34 and movement of a position of the vehicle 100 relative to the lane boundary 18 over time, such that when the position is generally constant relative to the lane boundary 18 and the steering angle is adjusted, the curvature of the roadway 20 can be determined from the steering angle. In a further embodiment, the lane departure warning system 10 may determine the curvature of the roadway 20 based on information provided by a global positioning system 36 of the vehicle 100, such as using a location of the vehicle 100 relative to mapping information as provided by a global positioning system 36 to determine the curvature of the roadway 20 according to the mapping information. Additional operations are contemplated and described herein for determining the curvature of the roadway 20 proximate the vehicle 100 and the trailer 105.

Figure 7:
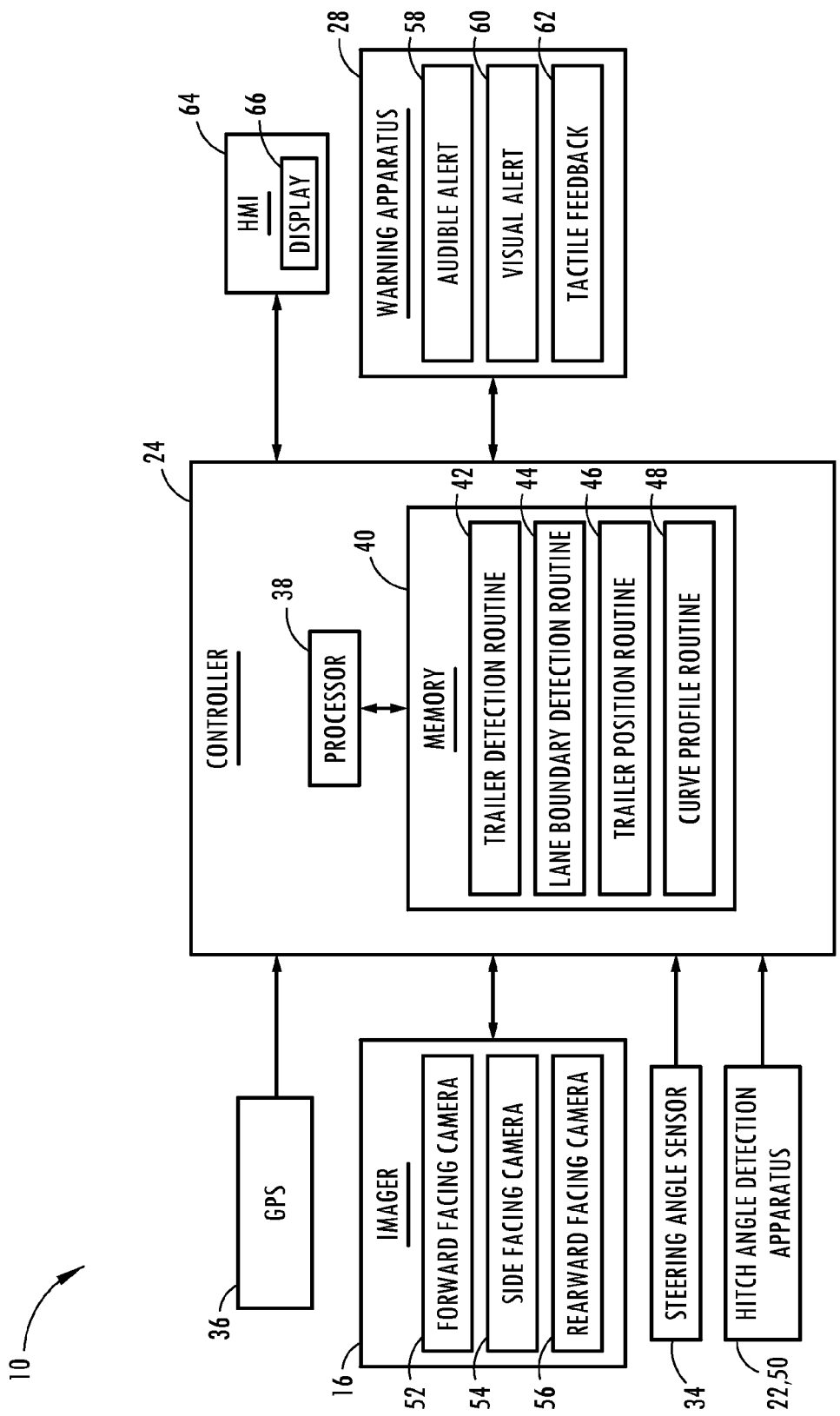
FIG. 7 is a schematic block diagram of a lane departure warning system, according to one embodiment of the present disclosure.

The lane departure warning system, as shown in the embodiment illustrated in FIG. 7, incldes a controller 24 for providing a lane departure warning for a vehicle 100 towing a trailer 105, monitoring connection of the trailer 105, monitoring the hitch angle γ, determining the curvature of the roadway 20, and initiating certain warnings and/or actions. The controller 24 may include a microprocessor 38 and/or other analog and/or digital circuitry for processing one or more routines. Additionally, the controller 24 may include memory 40 for storing one or more routines, including a trailer detection routine 42, a lane boundary detection routine 44, a trailer position routine 46, a curve profile routine 48, and other conceivable routines for image processing or other functions of the lane departure warning system. It should be appreciated that the controller 24 may be a standalone dedicated controller 24 or may be a shared controller 24 integrated with other control functions, such as integrated with the global positioning system 36 or the hitch angle detection apparatus 50, to process the images of the trailer 105 or roadway 20 and perform related functionality. In one embodiment, a hitch angle detection apparatus 50 may processes the acquired images of the trailer 105 from the controller 24 and other information such as trailer length L for use in determining the hitch angle γ between the trailer 105 and the vehicle 100.

An imager 16 is shown as an input for providing one or more camera image or video images to the controller 24 of the lane departure warning system, according to the embodiment shown in FIG. 6. The imager 16 may be a forward facing camera 52, a side facing camera 54, or a rearward facing camera 56 mounted on the vehicle 100 in a position and orientation to acquire images of the roadway 20 and/or trailer 105 towed by the vehicle 100. The controller 24 processes the one or more images from the imager 16 with one or more image processing routines, such as the trailer detection routine 42 to identify if the trailer 105 is attached and the lane boundary detection routine 44 to detect the lane boundary 18 on the roadway 20. The controller 24 may further process the images from the imager 16 in connection with the trailer position routine 46 and the curve profile routine 48, such as processing images of the roadway 20 taken by the forward facing camera 52 to determine the curvature of the roadway 20.

A global positioning system (GPS) 36 is also provided as an input for the lane departure warning system, as shown in the embodiment illustrated in FIG. 6. The global positioning system 36 may be integrated with the vehicle 100 or may be part of a portable device, such as a smart phone, and may provide a coordinate location of the vehicle 100 and may further provide locational information, such as the type of roadway 20 the vehicle 100 is traveling along, the relative tightness of curvature of the section of roadway 20 proximate the vehicle 100, the speed limit or recommended speed for the roadway 20, and other conceivable locational information as generally understood by one having ordinary skill in the art.

In addition, a steering angle sensor 34 and a hitch angle detection apparatus 50 are shown in FIG. 7 as inputs for the lane departure warning system. The steering angle sensor 34 is configured to determine the angle of the front steered wheels of the vehicle 100 and may be incorporated as a sensor 22 on the vehicle 100 proximate the steering wheel, the steering column, or other steering component. The hitch angle detection apparatus 50 may determine the hitch angle γ through a routine and/or a sensor 22, such as a rearward facing camera 56, ultrasonic sensors on the vehicle 100, a mechanical, electrical, and/or magnetic device between the vehicle 100 and the trailer 105, and other conceivable sensor for sensing the hitch angle γ between the trailer 105 and the vehicle 100.

Still referring to FIG. 7, the controller 24 may communicate with one or more devices including a warning apparatus 28, which may include an audible alert 58 such as from a speaker, a visual alert 60 such as an illuminated light, or tactile feedback 62 such as through a haptic vibration component proximate the operator of the vehicle 100. Additionally, the controller 24 may communicate with one or more vehicle human machine interfaces (HMIs) 64 including a display 66 such as a center stack mounted navigation/entertainment display in the vehicle 100 or on a handheld or portable device, such as a smartphone. The HMI 64 may allow for inputs into the lane departure system as well, such as inputting the trailer dimensions, selecting the type of trailer 105, or otherwise calibrating the lane departure warning system.

Figure 8:
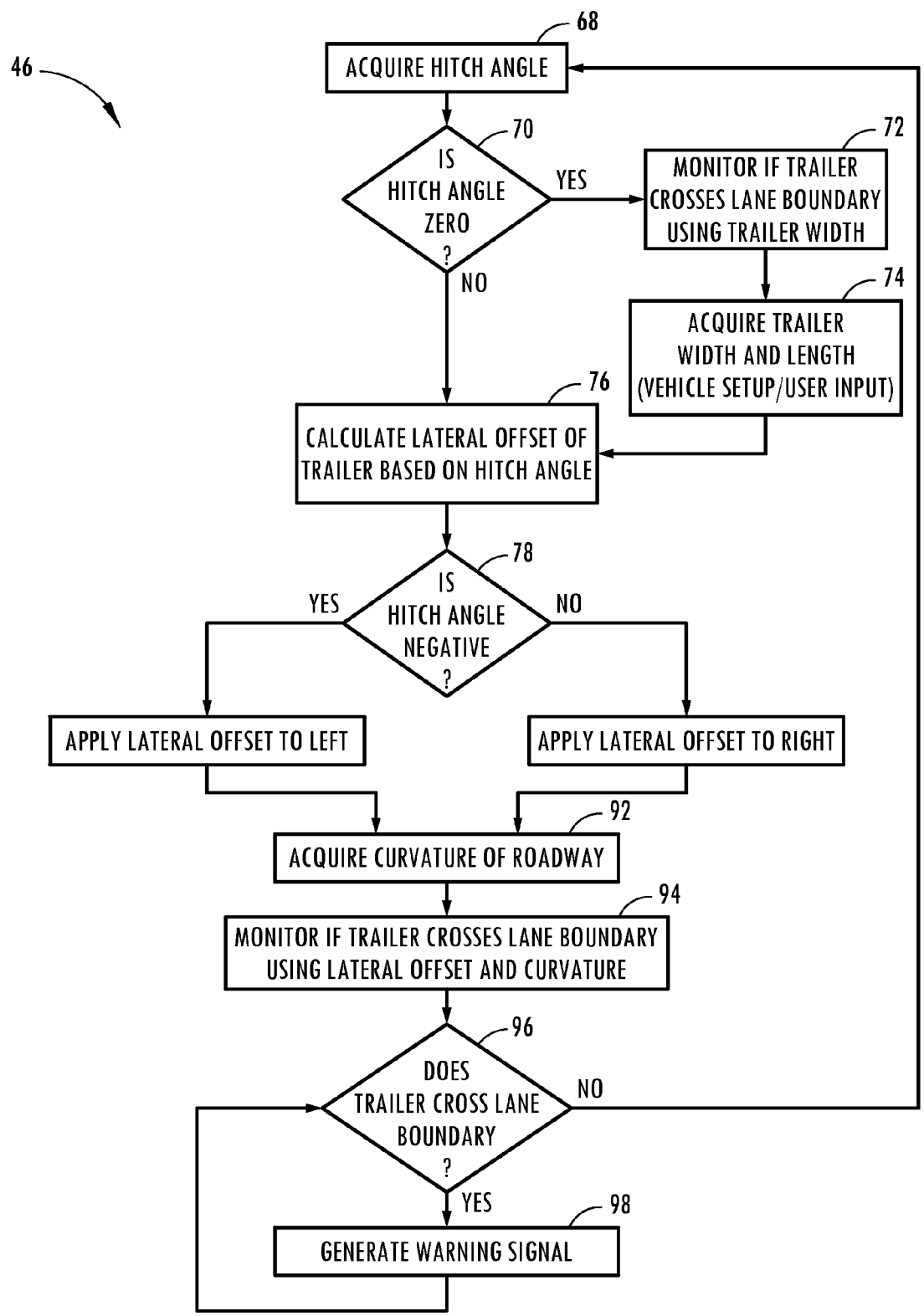
FIG. 8 is a flow diagram of a method for providing a lane departure warning using a trailer position routine.
Figure 9:
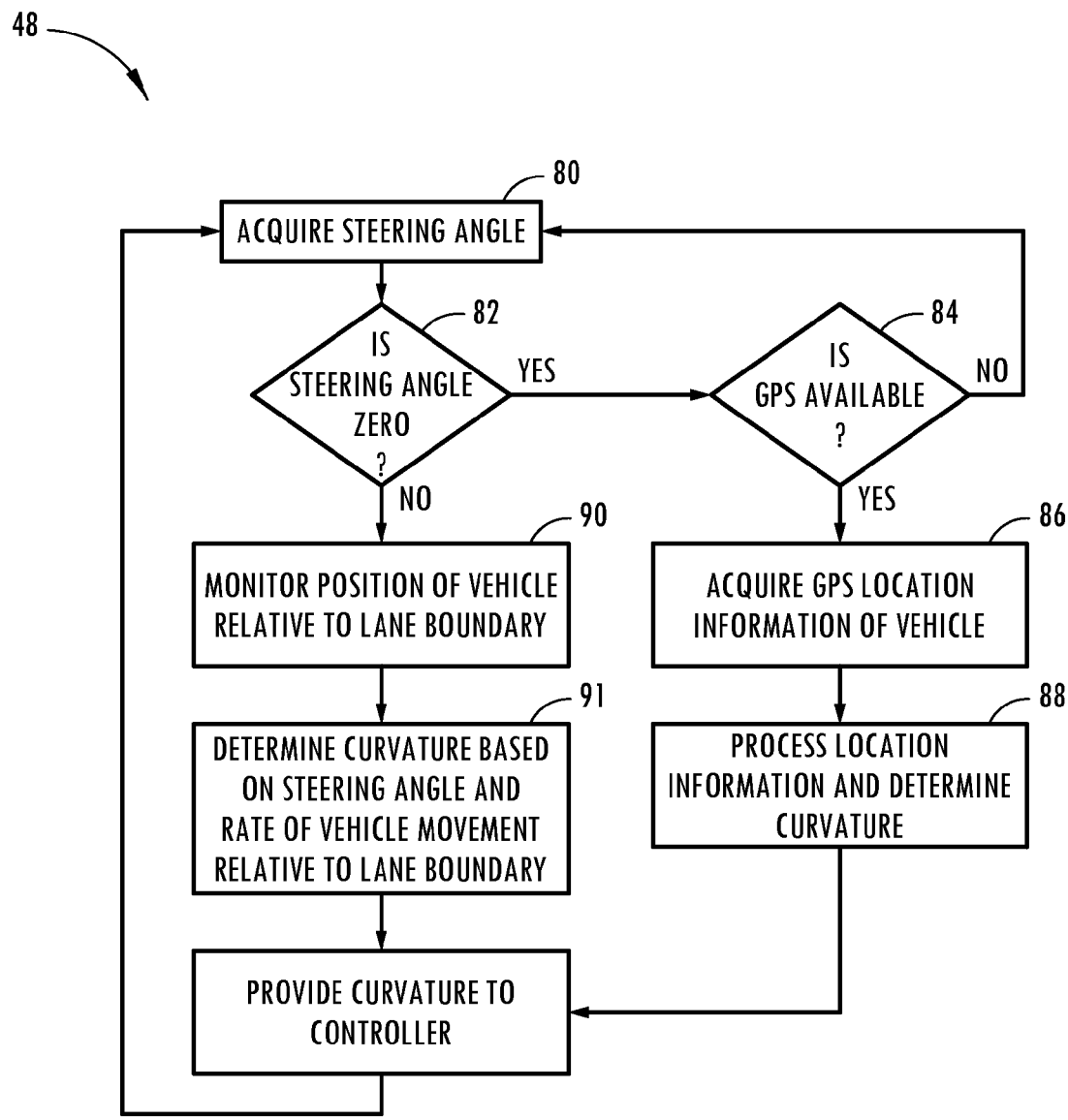
FIG. 9 is a flow diagram of a method for providing a lane departure warning using a curve profile routine.

The lane departure warning system 10 further includes a method, as illustrated in FIGS. 8-9, for providing a lane departure warning when the trailer 105 traverses the lane boundary 18, according to one embodiment. More specifically, the embodiment of the trailer position routine 46, as shown in FIG. 8, acquires the hitch angle at step 68, such as from the hitch angle detection apparatus 50 or from image processing of video images received from the rearward facing camera 56. At step 70, the routine determines whether the hitch angle γ is zero, and if it is generally zero, at step 72 the lane departure warning system 10 monitors for when the trailer 105 crosses the lane boundary 18, as detected by the lane boundary detection routine 44. The lane departure warning system 10 may be calibrated to account for trailer width, such that at step 74, the lane departure warning system 10 may acquire the dimensions of the trailer 105, including the width and the length L, as previously described. Using the trailer dimensions and the hitch angle γ, at step 76, the trailer position routine 46 may calculate the lateral offset 26 of the trailer 105, as described above. It is contemplated that the lateral offset 26 may be calculated based on additional or alternative information to account for the lateral movement of the trailer 105 relative to the vehicle 100, potentially resulting in unintended conditions of the vehicle 100 remaining within the lane width LW and the trailer 105 crossing the lane boundary 18, such as from trailer sway or other unforeseen circumstances. The lateral offset 26, at step 78, then is then analyzed by the trailer position routine 46 to determine whether the value of the lateral offset 26 is negative or positive, such that in the illustrated embodiment if it is positive it is applied to the right and if it is negative it is applied to the left. It is understood that these directions could be reversed in other embodiments.

Once the lateral offset 26 is applied to the appropriate side of the trailer 105 corresponding to the side where the trailer 105 extends away from the centerline CL of the vehicle 100, the trailer position routine 46 may acquire the curvature of the roadway 20, such as from the curve profile routine 48, from processing images of the roadway 20 and the lane boundaries 18 from the forward facing camera 52, from the GPS 36, or other conceivable curve profilers or methods of determining the curvature as generally understood by one having ordinary skill in the art. As illustrated in FIG. 9, one embodiment of the curve profile routine 48 is shown that incorporates the steering angle and the GPS, if available. At step 80 of the curve profile routine 48, the lane departure warning system 10 first acquires the steering angle of the vehicle 100, as provided by the steering angle sensor 34 (FIG. 7). At step 82, the value of the steering angle is analysed and if it is generally zero, the curve profile routine 48, at step 84, determines whether the GPS is available and if so, acquire GPS location information of the vehicle 100 at step 86. The location information is processed at step 88 by the controller 24 and/or the GPS to determine the curvature of the section of the roadway 20 on which the vehicle 100 and trailer 105 are traveling. If it is otherwise determined that the steering angle is not zero, at step 90, the curve profile routine 48 monitors the position of the vehicle 100 relative to the lane boundary 18 as the vehicle 100 and trailer 105 are traveling along the roadway 20 over time. At step 91, the curve profile routine 48 then determines the curvature based on the steering angle and the rate of vehicle movement relative to the lane boundary 18, accounting for vehicle speed and the dimensional variable of the vehicle 100 necessary to determine the curvature of the roadway 20 corresponding to the changes in the vehicle position. Again, in additional embodiments it is conceivable that the curvature may be sensed or otherwise determined by the imager 16, such as by a road detection model that processes images from the forward facing camera 52. Once the curvature is determined, whether at step 88 or step 91, the resulting curvature value is provided to the controller 24 for use by the lane departure warning system.

Referring again to FIG. 8, the trailer position routine 46 at step 92 acquires the curvature of the roadway 20 from the curve profile routine 48, according to one embodiment. The trailer position routine 46 at step 94 then monitors the trailer 105 for when the lateral offset 26 crosses the lane boundary 18, which is indicative of the rear corner 32 of the trailer 105 departing from the lane. When monitoring the trailer 105 for an unintentional departure from the lane boundary 18, the curvature of the roadway 20 may be accounted for, including when the curvature is substantially equal to zero on a straight section of the roadway 10, for example, to monitor for trailer sway outside of the lane of travel. To account for the curvature when greater than zero, according to one embodiment, the lateral offset 26 of the trailer 105 is reduced when the hitch angle γ correlates with the curvature, such that there is correlation when the hitch angle γ deviates from a centerline CL of the vehicle 100 in the same direction as the roadway 20 proximate the trailer 105. According to another embodiment, the curvature may be accounted for by reducing the lateral offset 26 in accordance with the magnitude of the curvature, such as decreasing the lateral offset 26 more in a tighter curvature.

If it is determined, at step 96, that the trailer 105 is crossing the lane boundary 18, at step 98, a warning signal is generated by the warning apparatus 28 (FIG. 7). Accordingly, it is understood that the warning signal may be calibrated with the lane departure warning system 10 to be generated in a number of configurations, including: after the trailer 105 actually crosses the lane boundary 18, such as by decreasing the lateral offset 26 by a select valve when determining the lateral offset 26; a distance before the trailer 105 actually crosses the lane boundary 18, such as combining the lateral offset 26 with a selected tolerance value and generating the warning signal when the combined value is great enough to traverse the lane boundary 18; or in increasing degrees of warning, such as increasing volume or providing additional types of warning, as the trailer 105 approaches the lane boundary 18. In one embodiment, the warning signal may generate an alert on the display of the HMI that may be dismissed by the operator, such as if the lane departure was intentional.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length L or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lane departure warning system for a vehicle towing a trailer, comprising:
   an imager detecting a lane boundary on a roadway;
   a sensor detecting a hitch angle between the vehicle and the trailer;
   a controller determining a lateral offset of the trailer relative to the vehicle based on the hitch angle and a length of the trailer; and
   a warning apparatus generating a signal when the lateral offset crosses the lane boundary.

2. The lane departure warning system of claim 1, wherein the imager is coupled with the vehicle and includes a field of vision in front of the vehicle.

3. The lane departure warning system of claim 1, further comprising:
   a curve profiler determining a curvature of the roadway, wherein the lateral offset of the trailer is reduced when the hitch angle correlates with the curvature.

4. The lane departure warning system of claim 3, wherein the curve profiler determines the curvature based on a steering angle of the vehicle and a position of the vehicle relative to the lane boundary over time.

5. The lane departure warning system of claim 3, wherein the curve profiler determines the curvature based on information provided by the imager.

6. The lane departure warning system of claim 3, wherein the curve profiler determines the curvature based on information provided by a global positioning system of the vehicle.

7. The lane departure warning system of claim 1, wherein the controller includes a trailer position routine that determines the lateral offset based on a width of the trailer by estimating a distance from a centerline of the vehicle to a rear corner of the trailer furthest from the centerline.

8. The lane departure warning system of claim 7, wherein the controller includes a curve profile routine that determines a curvature of the roadway, whereby the lateral offset is reduced based on a tightness of the curvature.

9. A method for providing a lane departure warning for a vehicle towing a trailer, comprising:
   detecting a lane boundary on a roadway with an imager;
   sensing a hitch angle between the vehicle and the trailer;
   determining a lateral offset of the trailer relative to the vehicle based on the hitch angle and a distance from a rotational point between the vehicle and trailer to a rear corner of the trailer, wherein the distance is calculated based on a length and width dimension of the trailer; and
   generating a warning signal when the lateral offset traverses the lane boundary.

10. The method of claim 9, further comprising:
    determining a curvature of the roadway proximate the vehicle, wherein the lateral offset of the trailer is reduced when the hitch angle correlates with the curvature.

11. The method of claim 10, wherein the hitch angle correlates with the curvature when the hitch angle deviates from a centerline of the vehicle in the same direction as the roadway proximate the trailer.

12. The method of claim 11, wherein the curvature of the roadway is determined based on information provided by a field of vision in front of the vehicle monitored by the imager.

13. The method of claim 12, wherein the curvature correlates with a steering angle of the vehicle based on movement of a position of the vehicle relative to the lane boundary over time.

14. The method of claim 11, wherein the curvature of the roadway is determined based on a location of the vehicle relative to mapping information as provided by a global positioning system.

15. The method of claim 11, further comprising:
    receiving the length dimension of the trailer and the width dimension of the trailer based on an identification of the trailer.

16. The method of claim 11, further comprising:
    determining the lateral offset as defined as a distance perpendicular from a longitudinal extent of an edge of the vehicle to a rear corner of the trailer furthest from the centerline; and
    selecting a tolerance value, wherein the warning signal is generated when the lateral offset combined with the tolerance value is great enough to traverse the lane boundary.

17. A method for providing a lane departure warning for a vehicle towing a trailer, comprising:
    detecting a lane boundary on a roadway proximate the vehicle;
    determining a curvature of the roadway proximate the vehicle;
    sensing a hitch angle between the vehicle and the trailer;
    determining a lateral offset of an outside rear portion the trailer relative to the vehicle based on the hitch angle, a length of the trailer, and a width of the trailer;
    reducing the lateral offset when the curvature is greater than a threshold curvature tightness and correlates with an orientation of the hitch angle; and
    generating a warning signal when the lateral offset crosses the lane boundary.

18. The method of claim 17, wherein the orientation of the hitch angle correlates with the curvature when the hitch angle deviates from a centerline of the vehicle in the same direction as the roadway proximate the trailer.

19. The method of claim 17, wherein the lateral offset is defined as a distance perpendicular from a centerline of the vehicle to a rear corner of the trailer furthest from the centerline.

20. The method of claim 17, wherein the curvature of the roadway is determined based on a location of the vehicle relative to mapping information as provided by a global positioning system.

* * * * *